United States Patent [19]

Butcher

[11] Patent Number: 5,101,129
[45] Date of Patent: Mar. 31, 1992

[54] MOUNTING BUSHING FOR AN OVERLOAD PROTECTOR

[75] Inventor: James A. Butcher, Fort Wayne, Ind.

[73] Assignee: General Electric Company, Fort Wayne, Ind.

[21] Appl. No.: 452,101

[22] Filed: Dec. 18, 1989

[51] Int. Cl.$^5$ .................. H02K 11/00; H02K 5/00; H01B 17/26

[52] U.S. Cl. .................. 310/68 C; 174/153 G; 310/89

[58] Field of Search .......... 310/68 C, 89; 174/65 G, 174/153 G; 248/27.1, 27.3

[56] References Cited

U.S. PATENT DOCUMENTS

| | | | |
|---|---|---|---|
| 3,123,662 | 3/1964 | Fink | 248/56 |
| 3,395,297 | 7/1968 | Shifley | 248/27.3 |
| 3,502,917 | 3/1970 | Bizoe | 310/71 |
| 4,220,808 | 9/1980 | Fujita | 248/27.3 |
| 4,289,923 | 9/1981 | Ebert | 174/65 G |
| 4,325,525 | 4/1982 | Iafret | 248/27.3 |
| 4,451,720 | 5/1984 | Ludwig | 248/27.3 |
| 4,678,879 | 7/1987 | Kenway | 248/27.3 |
| 4,729,534 | 3/1988 | Hill et al. | 248/56 |
| 4,928,349 | 5/1990 | Oikawa et al. | 174/153 G |

FOREIGN PATENT DOCUMENTS 2005130 8/1971 Fed. Rep. of Germany ..... 248/27.1

OTHER PUBLICATIONS

Dwg. No. EX935-90, Texas Instruments Incorporated, "Mounting Variations for 2BM Motor Protector", Jul. 24, 1973.

Primary Examiner—Steven L. Stephan
Assistant Examiner—C. LaBalle
Attorney, Agent, or Firm—Ralph E. Krisher, Jr.

[57] ABSTRACT

A bushing for mounting an overload protector within an opening in a motor shell comprises segments adapted to be coaxially positioned around a portion of the overload protector. Mating features formed on the segments and protector restrict movement of the protector relative to the segments. Grooves formed on the segments secure the segments within the opening and restrict movement of the bushing and protector assembly relative to the structure. The bushing preferably comprises a pair of generally symmetrical segments connected together by an integrally formed hinge. The one-piece bushing is molded from a thermoplastic material, such as nylon. In one embodiment, the features which restrict axial movements of the overload protector relative to the segments are mating threads formed on a portion of the internal surfaces of the segments, and on opposing portions of the external surface of the protector. An additional structure is formed on the exterior surface of the segments to prevent rotational movement of the protector relative to the bushing. In an alternative embodiment, a structure is formed on and extends from the segments, and at least partially surrounds the overload protector to secure the protector against opposing portions of the bushing. A portion of each of the segments extends outwardly from the exterior surface of the motor shell so as to shield an exposed end portion of the overload protector from damage. A gasket may be mounted to this portion of the bushing to protect the overload assembly from dust and contamination.

31 Claims, 2 Drawing Sheets

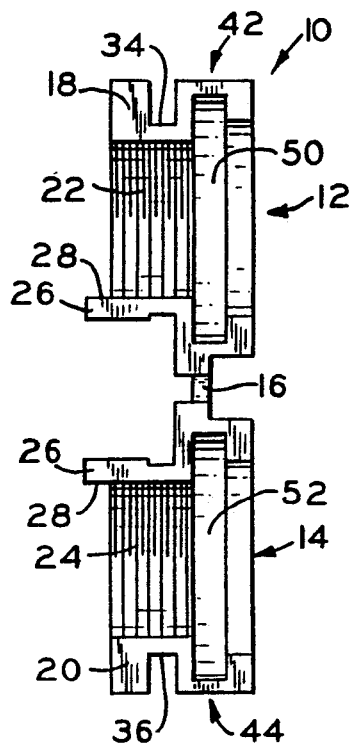
FIG_1a
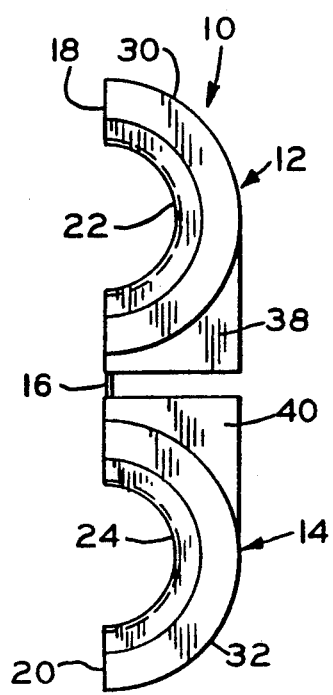
FIG_1b
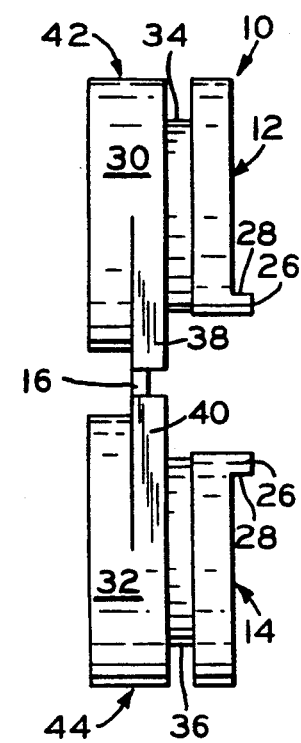
FIG_1c
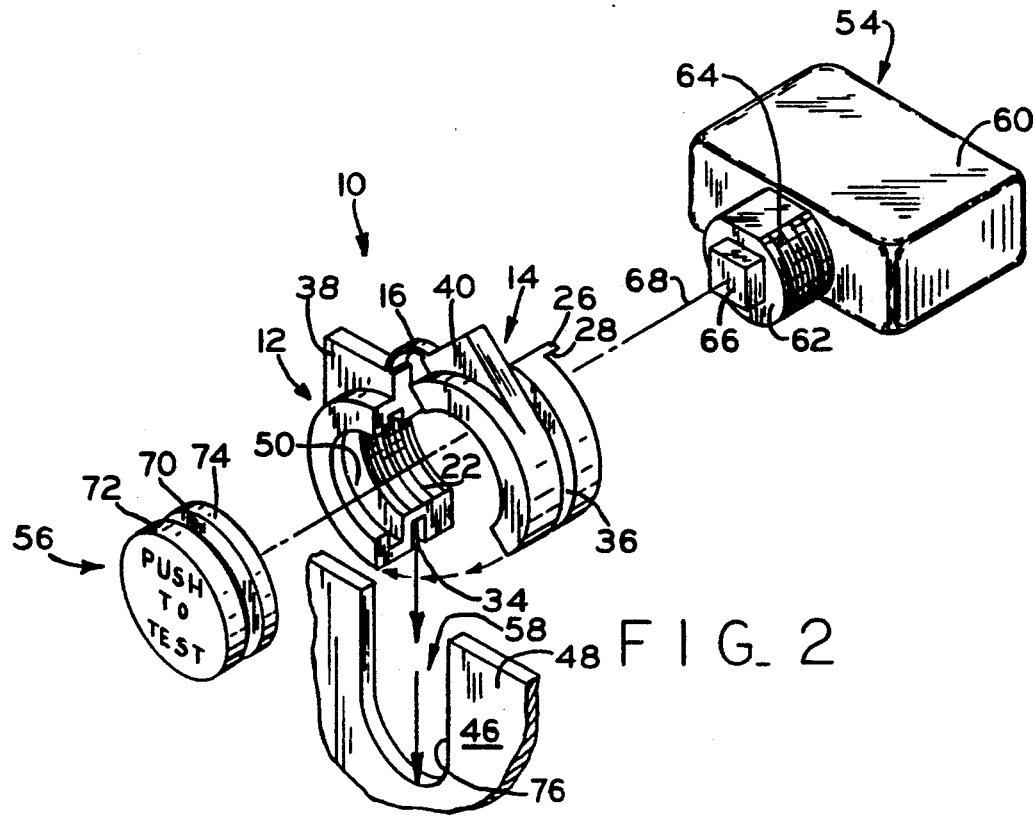
FIG_2

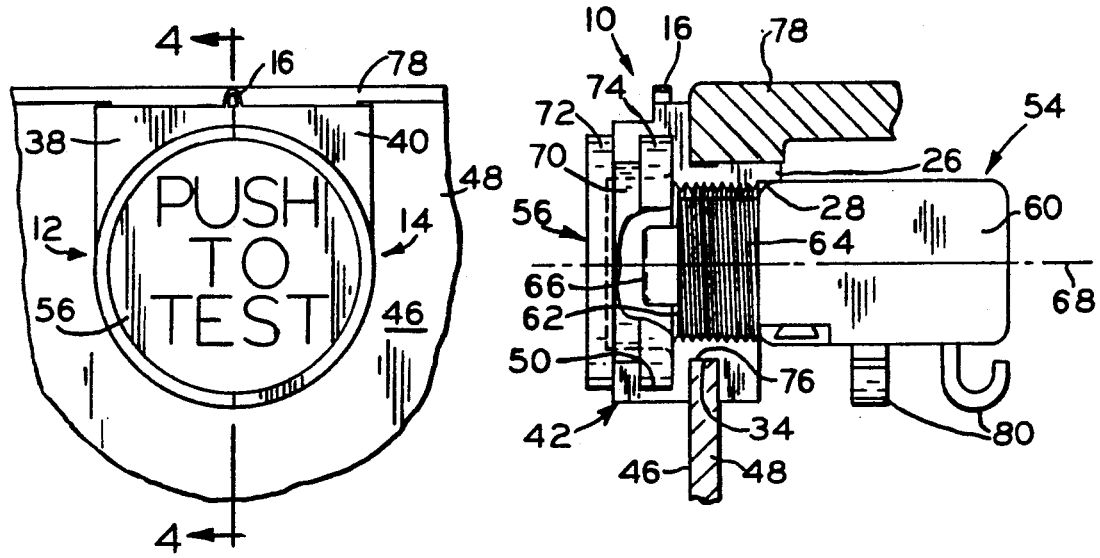
FIG_3  FIG_4
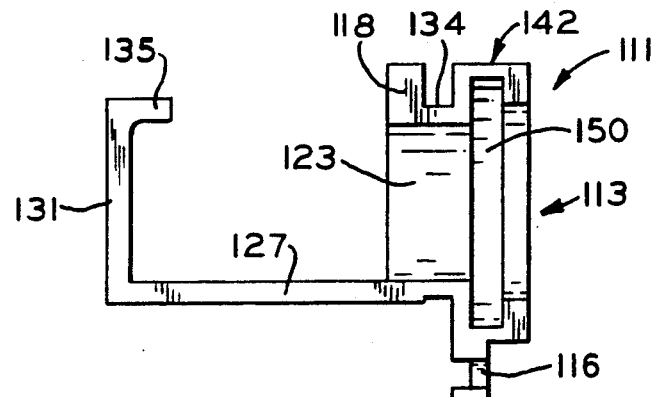
FIG 5
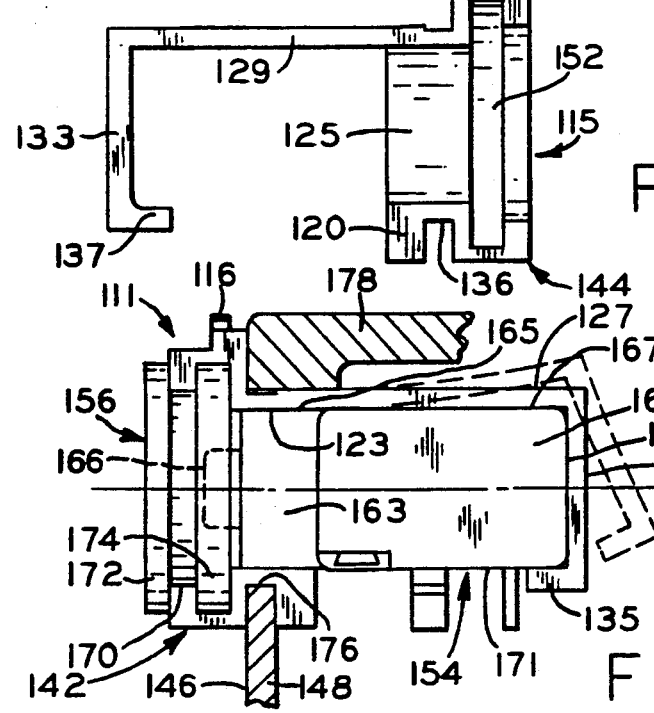
FIG_6

MOUNTING BUSHING FOR AN OVERLOAD PROTECTOR

BACKGROUND AND SUMMARY OF THE INVENTION

This invention relates generally to mounting apparatus and, more particularly, to a mounting bushing for mounting an overload protector within an opening in a structure, such as a motor shell.

Thermally actuated overload protectors are often provided in combination with small electric motors and similar devices to protect such devices from the effects of prolonged mechanical and electrical overloads, or other conditions which may lead to temperature increases and thermal overload of the subject devices. One example of an overload protector used for this purpose is the 2BM series, manual reset thermal protector which is manufactured by the KLIXON ® subsidiary of Texas Instruments, Inc. The KLIXON ® 2BM thermal protector is a normally closed device designed to protect fractional horsepower motors, while occupying a limited amount of space. The 2BM protector is typically mounted within the motor shell, in or immediately adjacent an opening in the shell which provides access to the manually actuated "pop-out" reset button.

Typical mounting arrangements for the KLIXON ® 2BM thermal protector are described in Drawing No. EX 935-90 entitled "Mounting Variations for 2BM Motor Protector" which is available from Texas Instruments, Inc. of Attleboro, Mass. These arrangements include a variety of metal brackets which are typically attached by screws or other means to some portion of the mounting surface, and which support the 2BM protector against axial and rotational movement relative to the motor shell. Another mounting technique described in Drawing No. EX 935-90 involves the use of a circular spring clip. The 2BM protector has a cylindrical portion which surrounds the reset button and which is normally disposed within an opening (e.g., a round hole) formed in the mounting surface. A metal spring clip is forced over the cylindrical portion of the protector after that portion has been positioned within a round opening in the motor shell to secure the cylindrical portion of the protector to the shell.

Another mounting technique which is presently used by the assignee of the present application, and which involves the use of threads formed on the surface of the cylindrical portion of the 2BM protector, employs a washer and nut having an internal diameter which matches the external diameter of the threaded portion of the 2BM protector. When the protector is installed in this manner, the threaded cylindrical portion is aligned with and inserted through a round hole formed in the supporting structure. The metal washer and nut are placed over and threaded onto the cylindrical portion of the protector until a tight fit is obtained.

Although the above-discussed techniques for mounting the 2BM protector have been somewhat successful, certain disadvantages to these techniques have been noted. Each of the metal brackets described in Texas Instruments Drawing No. EX 935-90 must be attached by screws or other means to the inside of the mounting surface. This normally requires a manual assembly operation and requires handling and installation of screws, rivets or other fasteners. Use of the spring clip or washer and nut arrangements may reduce assembly time and the number of parts required. However, these techniques still require manual assembly and manipulation of two or more relatively small parts. Moreover, all of these mounting devices are formed of metal and, thus, present some shock hazard or risk of short circuit in the event of insulation breakdown or improper installation of the devices.

Another disadvantage of the mounting arrangements described above involves damage to the exposed portion of the thermal protector during the assembly, handling, or installation processes. When the thermal protector is mounted through an opening in the side of a motor shell, the reset button and a part of the cylindrical portion of the protector body extends through the opening and outwardly from the surface of the shell. As groups of motors are conveyed through the assembly process or gathered together for packaging or further processing, the exposed reset button and cylindrical portion may be struck by other motors or otherwise impacted in such a manner as to cause damage to the exposed protector or mounting device. In this event, the entire motor must be returned to the assembly area for repair and re-installation of a new thermal protector.

It is an object of the present invention to provide a novel arrangement for mounting a thermal protector which does not suffer from the disadvantages of prior art mounting arrangements.

Another object of the present invention is to provide a mounting arrangement for an overload protector which significantly reduces the material and labor costs associated with mounting the protector in a motor shell, as compared to Prior art mounting techniques.

Another object of the present invention is to provide a one-piece, non-metallic mounting bushing for an overload protector which may be employed to more quickly and easily mount the protector within an opening in a motor shell, and which improves the overall quality and reliability of the finished product.

Yet another object of the present invention is to provide a mounting bushing for an overload protector which provides a degree of mechanical protection for the exposed portion of the thermal protector after the protector has been mounting within an opening in a structure.

These and other objects of the present invention are attained in a bushing for mounting an overload protector within an opening in a motor shell, which comprises a plurality of segments adapted to be coaxially positioned around a portion of the overload protector, means formed on at least one of these segments for restricting movement of the overload protector relative to the segments, and means formed on the segments for securing the segments within the opening so as to restrict movement of the bushing and overload protector assembly relative to the motor shell. In one embodiment of the invention, the plurality of segments comprise a pair of generally symmetrical segments which are connected together by an integral hinge to form a unitary structure. This unitary structure is preferably molded in a single piece from a moldable thermoplastic material, such as nylon. In addition to being provided with features which restrict axial and rotational movements of the overload protector relative to the mounting bushing and motor shell, each of the segments is provided with a portion which extends outwardly from the exterior surface of the shell when the bushing is operably positioned within the opening so as to shield an otherwise exposed end portion of the overload protector from damage. These outwardly extending portions of the segments further comprise means for mounting a gasket to the bushing to protect the bushing and overload assembly from dust and other contaminants.

In one embodiment of the present invention, the bushing comprises a pair of generally symmetrical segments, each having an interior surface and an exterior surface. The interior surfaces of the segments define a cylindrical bore when the segments are in an opposing operable position. This bore is adapted to receive a mating cylindrical portion of the overload protector and to secure this portion of the protector against axial movements relative to the segments. Means are formed on the exterior surfaces of the segments for securing the bushing and protector assembly within the opening in the motor shell. Threads are provided on the interior surfaces of the segments which define the cylindrical bore, to mate with matching threads provided on an exterior surface of the cylindrical portion of the overload protector. These mating threads secure the overload protector against axial movements relative to the segments. Means are further provided on the exterior surface of at least one of the segments for restricting rotational movements of the overload protector relative to the bushing. In one particularly preferred embodiment of the invention, such means comprises a lip formed on the exterior surface of at least one of the segments. The lip extends in parallel relation to the common axis of the segments and protector. A portion of the lip is defined by a relatively flat surface which is positioned adjacent a flat surface of the overload protector when the segments are positioned around the protector so as to prevent rotational movement of the protector relative to the bushing segment. The means formed on the exterior surfaces of the segments for securing the segments within the opening preferably comprises a circumferential groove adapted to receive an edge portion of the motor shell which defines at least a portion of the opening in the shell. When the opening in the shell takes the form of a U-shaped slot, the circumferential groove receives a U-shaped edge portion of the shell which defines the slot. The bushing at the open end of the slot is secured in place by, for example, an end bell housing which is mounted to the end of the motor shell.

In an alternative embodiment of the invention, the interior surface of the cylindrical bore defined by the segments and the exterior surface of the cylindrical portion of the overload protector are smooth. In this embodiment, the means for securing the overload protector to the segments comprises a member extending from at least one of the segments across at least two surfaces of a rectangular portion of the overload protector. In this embodiment of the invention, the member comprises a first portion extending generally perpendicularly from the segment across a first surface of the protector, a second portion extending generally perpendicularly from the first portion across a second surface of the protector, and a third portion extending from the second portion across a third surface of the protector so as to secure the protector to the segment, and so as to prevent the protector from moving axially or rotationally relative to the bushing. The member thus at least partially surrounds the overload protector and holds the protector in position against opposing portions of the bushing.

Other objects, advantages and novel features of the present invention will become apparent from the following detailed description of the invention when considered in conjunction with the accompanying drawings.

BRIEF DESCRIPTION OF THE DRAWINGS

FIGS. 1(a), 1(b) and 1(c) show front, side and rear plan views of a bushing for mounting an overload protector which is constructed in accordance with the present invention.

FIG. 2 shows an exploded view of the bushing of FIG. 1, an overload protector, a portion of a motor shell, and a gasket member, prior to assembly of the bushing, protector and gasket in an operable position within an opening in the motor shell.

FIG. 3 shows a front view of the gasket member and bushing of FIG. 2 in position within the opening of the motor shell.

FIG. 4 shows a cross-sectional view, taken along line 4—4 of FIG. 3, of the components shown in FIG. 2 operably positioned within the opening of the motor shell.

FIG. 5 shows a front plan view of an alternative embodiment of an overload protector mounting bushing constructed in accordance with the present invention.

FIG. 6 shows a cross-sectional view of the bushing of FIG. 5, an overload protector, and a gasket member mounted within an opening in a motor shell.

DETAILED DESCRIPTION OF THE DRAWINGS

FIGS. 1(a), 1(b) and 1(c) show front, side and rear views of a bushing for mounting an overload protector within an opening in a motor shell. The preferred embodiment illustrated is especially well-suited for mounting a 2BM series, manual reset, thermal protector which is manufactured by the KLIXON ® subsidiary of Texas Instruments, Inc. However, the principals of the present invention may be readily adapted to mounting other types of protectors without departing from the spirit of the present invention and the scope of the claims appended below.

FIG. 1(a) shows a mounting bushing 10 which comprises two segments 12 and 14 which are connected together by a hinge member 16. Segments 12 and 14 in the embodiment illustrated are generally symmetrical in shape, and are formed of a moldable thermoplastic material, such as nylon. Hinge 16 is integrally formed of the same material so that segments 12 and 14 and hinge member 16 form a unitary structure. This unitary structure simplifies and facilitates handling and incorporation of the bushing into an assembly which includes an overload protector and a motor shell, as described in additional detail below.

Segments 12 and 14 of bushing 10 have internal surfaces 18 and 20, respectively, which are designed for mating contact with one another, and for positioning adjacent an exterior surface of at least a portion of an overload protector. In the embodiment of the invention illustrated in FIGS. 1–4, portions 22 and 24 of surfaces 18 and 20, respectively, are threaded so as to mate with like threads formed on a cylindrical portion of the overload protector device. When bushing 10 is assembled around the threaded portion of the overload protector, the mating threads prevent axial movements of the protector, relative to bushing 10. Bushing 10 is further provided with a lip 26, formed on at least one of segments 12 and 14, extending adjacent to and coaxially with threaded portions 22 and 24 of internal surfaces 18 and 20. Lip 26 includes a flat surface 28 which, as illustrated more clearly in FIG. 4, is positioned adjacent a flat surface of the overload protector to prevent the protector from being moved rotationally, relative to bushing 10. This combination of features assures that the overload protector will be firmly secured against both linear (axial) and rotational movements, relative to mounting bushing 10.

Segments 12 and 14 of bushing 10 have respective external surfaces 30 and 32, upon which are formed circumferential grooves 34 and 36, respectively. Grooves 34 and 36 are used for securing bushing 10 within an opening (such as a slot) in a motor shell, as is illustrated in additional detail in FIGS. 2-6 below.

Another feature of bushing 10, which is illustrated clearly in FIG. 1(b), are triangular shield portions 38 and 40 which extend upwardly from one side of each of segments 12 and 14, and which extend outwardly from hinge member 16. Shield portions 38 and 40 serve to conceal what might otherwise be an exposed portion of a slot into which bushing 10 may be mounted, as illustrated in FIGS. 2 and 3.

portions 42 and 44 of segments 12 and 14, respectively, extend outwardly from threaded portions 22 and 24 of the segments (i.e., outwardly from exterior surface 46 of motor shell 48, as illustrated in FIGS. 3 and 4). Portions 42 and 44 perform at least two functions: they form a protective "hood" to shield the exposed portion of the overload protector from damage during assembly and handling of the motor; and they allow for the formation of circumferential grooves 50 and 52 (FIG. 1(a)) in the interior surfaces of segments 12 and 14, which grooves accept and retain a protective gasket member in position over the exposed end of the overload protector. Both of these functions are discussed in additional detail below in connection with FIGS. 3 and 4.

FIG. 2 shows an exploded view of busing 10, an overload protector 54 and a gasket member 56 immediately prior to assembly and positioning within an opening (slot 58) formed in motor shell 48. Overload protector 54 includes a rectangular body portion 60, which typically houses a thermal element and at least one set of electrical contacts, and a cylindrical portion 62. In the embodiment illustrated in FIG. 2, an external surface of cylindrical portion 62 is provided with threads 64. A reset button 66 is provided at the "exposed" end of cylindrical portion 62 which faces outwardly from body portion 60.

Cylindrical portion 62 of overload protector 54 is aligned along an axis 68, as illustrated in FIG. 2. Bushing 10 in FIG. 2 is coaxially aligned along axis 68, with segments 12 and 14 spread open so as to allow threaded portions 22 and 24 of segments 12 and 14 to be positioned adjacent the threaded exterior surface 64 of cylindrical portion 62 of overload protector 54. When segments 12 and 14 are closed around cylindrical portion 62, threaded portions 22 and 24 and the threads on exterior surface 64 mate to restrict relative movements of the segments and overload protector 54 along their common axis 68.

Gasket member 56 in FIG. 2 is a generally flat, cylindrically shaped rubber member which is provided with a circumferential groove 70 extending around its outer periphery. The presence of groove 70 in the cylindrical side wall of gasket member 56 creates front and back circumferentially extending lips 72 and 74, respectively. Lip 74 is adapted to be received within circumferential grooves 50 and 52 of segments 12 and 14, as is best illustrated in FIG. 4. Thus, when segments 12 and 14 are in a closed position, gasket 56 is held securely in position over reset button 66 and the exposed end of cylindrical portion 62 of overload protector 54.

After segments 12 and 14 have closed about portion 62 of overload protector 54 and lip 74 of gasket member 56, the gasket/bushing/protector assembly is inserted into an operable position within slot 58 of motor shell 48. Slot 58 is defined by an edge portion 76 of motor shell 48. Edge portion 76 is received within circumferential slots 34 and 36 of segments 12 and 14. Positioning of edge portion 76 within slots 34 and 36 secures the segments within the opening and restricts movement of the gasket/bushing/protector assembly relative to motor shell 48.

FIG. 3 shows a front view of the gasket/bushing/protector assembly after final positioning within slot 58 of motor shell 48. An end bell housing member 78 is shown in position to complete the mounting installation. FIG. 3 clearly illustrates the functions of shield portions 38 and 40 in covering portions of slot 58 which might otherwise be exposed. Shield portions 38 and 40 serve an aesthetic function in hiding the exposed portion of slot 58. In addition, portions 38 and 40 function to prevent entry of dust, dirt and other contaminants into the motor shell through exposed portions of slot 58.

FIG. 4 shows a cross-sectional view, taken along line 4—4 of FIG. 3, of the components shown in FIG. 2 operably positioned within slot 58 of motor shell 48. Also visible in FIG. 4 are electrical terminals 80 which exit through the bottom of rectangular portion 60 of overload protector 54, and which are available for connection to appropriate points within the control or power circuits of the associated device. The function of lip 26 is also clearly illustrated in FIG. 4. Lip 26 extends in generally parallel relation to central axis 68. Surface 28 of lip 26 lies adjacent the generally flat top surface of rectangular portion 60. The presence of lip 26 prevents overload protector 54 from rotating about axis 68 in either direction, and thus assures that terminals 80 will be maintained in proper position and orientation.

FIG. 4 also further illustrates the relative positioning of cylindrical portion 62 and reset button 66 relative to bushing 10 and gasket member 56. A portion of gasket member 56 is broken away in FIG. 4 to show reset button 66 in the "tripped" position (solid lines) and in the reset position (dashed lines). As illustrated, when overload protector 54 operates (i.e., trips or opens the circuit between terminals 80), reset button 66 extends outwardly from cylindrical portion 62 into the generally hollow interior of gasket member 56. The front portion of gasket member 56 (the periphery of which is defined by lip 72) is relatively soft and elastic so as to allow button 66 to be returned to the reset position easily, and without removal or disassembly of gasket member 56 or any of the other components.

FIG. 5 shows a front plan view of an alternative embodiment of the overload protector mounting bushing of the present invention. Some of the features of the embodiment of FIG. 5 are similar or identical to like features of the embodiment of FIGS. 1-4. Where appropriate, corresponding reference numbers (increased by 100 in the case of the second embodiment) are used for like features. FIG. 5 shows a mounting bushing 111 which comprises two segments 113 and 115 connected together by a hinge member 116.

As with the previous embodiment, segments 113 and 115 are generally symmetrical in shape, and may be formed of a moldable thermoplastic material, such as nylon. Segments 113 and 115 and hinge 116 are integrally formed of the same material to create a unitary structure having the associated advantages discussed above.

Segments 113 and 115 have internal surfaces 118 and 120, respectively, which are designed for mating contact with one another. However, unlike the embodiment of FIGS. 1-4, portions 123 and 125 of internal surfaces 118 and 120, respectively, are smooth, rather than threaded. The means for securing the overload protector against axial and rotational movements relative to the segments in the embodiment of FIG. 5 are structures formed on each of the segments which include: first portions 127 and 129 which extend outwardly and generally perpendicularly from segments 113 and 115, respectively; portions 131 and 133 which extend generally perpendicularly from the ends of portions 127 and 129, respectively; and portions 135 and 137 which extend generally perpendicularly from portions 131 and 133 inwardly toward segments 113 and 115.

FIG. 6 shows a cross-sectional view of bushing 111 and overload protector 154 and a gasket member 156, operably mounted within an opening in a motor shell 148. Overload protector 154 includes a generally rectangularly shaped body portion 160, and a cylindrically shaped portion 163. Unlike the corresponding body portion 62 of overload protector 54 shown in FIGS. 2 and 4, portion 163 has a smooth exterior surface 165. Rectangular body portion 160 of protector 154 has a generally flat top surface 167, a generally flat back surface 169, and a generally flat bottom surface 171. As illustrated in FIG. 6, portion 127 of bushing 111 extends across surface 167, portion 131 extends across surface 169, and portion 135 extends inwardly across part of surface 171, so as to secure overload protector 154 against movements (axial and rotational) relative to bushing 111. As illustrated by dashed lines in FIG. 6, portions 127 and 131 may be flexed somewhat to facilitate assembly of the overload protector and bushing. Thus, portions 127, 131 and 135 partially surround rectangular body portion 160 of protector 154, and hold portion 160 in position against opposing portions of bushing 111.

From the preceding description of the illustrated embodiments, it is evident that the objects of the present invention are attained. Although the invention has been described and illustrated in detail, it is to be clearly understood that this description is intended by way of illustration and example only and is no intended to be taken by way of limitation. The spirit and scope of the invention are to be limited only by the terms of the appended claims.

What is claimed is:

1. A bushing for mounting an overload protector within an opening in a motor shell, comprising:
   a plurality of segments adapted to be coaxially positioned around a portion of the overload protector, each of said segments having an interior surface adapted for positioning adjacent a rigid exterior surface of said portion of the overload protector, and an exterior surface adapted for positioning within the opening in the motor shell;
   means formed on the interior surfaces of the segments for mating with a complimentary feature formed on the exterior surface of the overload protector to effectively restrict relative movements of the segments and the overload protector along their common axis when the segments are positioned around the protector; and
   means formed on the exterior surfaces of the segments for securing the segments within the opening so as to restrict movement of the bushing and protector assembly relative to the motor shell;
   wherein each of the segments has a portion which extends outwardly from an exterior surface of the motor shell and beyond an outwardly facing end portion of the overload protector when the bushing is operably positioned within the opening so as to shield the end portion of the overload protector from damage.

2. A bushing according to claim 1, further comprising means formed on the exterior surface of at least one of the segments for restricting rotational movement of the overload protector relative to the bushing.

3. A bushing according to claim 2, wherein said means for restricting rotational movement of the overload protector comprises a lip formed on the exterior surface of at least one of the segments and extending in parallel relation to the common axis of the segments and protector, said lip defining a relatively flat surface which is positioned adjacent a flat surface on the overload protector when the segments are positioned around the protector so as to prevent rotational movement of the protector relative to the bushing segment.

4. A bushing according to claim 1, wherein said plurality of segments comprise two generally symmetrical segments.

5. A bushing according to claim 1, wherein said segments are hinged together to form a unitary structure.

6. A bushing according to claim 5, wherein said unitary structure is formed of a thermoplastic material, such as nylon.

7. A bushing according to claim 1, wherein said means formed on the interior surfaces of the segments comprise threads which are adapted to mate with corresponding threads formed on the exterior surface of the overload protector.

8. A bushing according to claim 1, wherein said means formed on the exterior surfaces of the segments for securing the segments within the opening comprises a circumferential groove adapted to receive an edge portion of the motor shell, which edge portion defines at least a portion of the opening in the motor shell.

9. A bushing according to claim 1, further comprising means for mounting a gasket to a portion of said bushing which faces outwardly from the structure to protect the bushing and overload assembly from dust and contamination.

10. A bushing according to claim 9, wherein said means for mounting the gasket comprises a circumferential groove formed in the segments and adapted to receive a mating circumferential portion of the gasket.

11. A bushing according to claim 1, wherein said segments which comprise the mounting bushing are formed of a thermoplastic material, such as nylon.

12. A bushing for mounting an overload protector within an opening in a motor shell, comprising a pair of generally symmetrical segments, each segment having an interior surface, said interior surfaces defining a cylindrical bore when the segments are in an opposing operable position, said bore being adapted to receive a relatively rigid, mating cylindrical potion of the overload protector and to secure, without deforming, said portion of the protector against axial movements relative to the segments, each of said segments having an exterior surface, and means formed on the exterior surfaces of the segments for securing the bushing and protector assembly within said opening, wherein each of the segments has a portion which extends outwardly from an exterior surface of the motor shell and beyond an outwardly facing end portion of the overload protector when the bushing is operably positioned within the opening so as to shield the end portion of the overload protector from damage.

13. A bushing according to claim 12, wherein said segments are hinged together to form a unitary structure.

14. A bushing according to claim 12, wherein said segments are formed of a thermoplastic material, such as nylon.

15. A bushing according to claim 12, further comprising means formed on the exterior surface of at least one of the segments for restricting rotational movement of the overload protector relative to the bushing.

16. A bushing according to claim 12, further comprising means for restricting rotational movement of the overload protector relative to the bushing.

17. A bushing according to claim 12, wherein threads are provided on the interior surfaces of the segments which define the cylindrical bore, to mate with matching threads provided on the cylindrical portion of the overload protector.

18. A bushing according to claim 12, wherein said means formed on the exterior surfaces of the segments for securing the segments within the opening comprises a circumferential groove adapted to receive an edge portion of the motor shell, which edge portion defines at least a portion of the opening in the motor shell.

19. A bushing according to claim 12, wherein each of said segments includes a portion which is disposed outwardly of the motor shell, relative to the opening, when the bushing is in the operable position, and further comprising means for mounting a gasket to said portions of the segments to protect the overload protector from dust and other contaminants.

20. A bushing according to claim 19, wherein said means for mounting the gasket comprises a circumferential groove formed in the segments and adapted to receive a mating circumferential portion of the gasket.

21. A bushing for mounting an overload protector having first and second body portions within an opening in a motor shell, comprising:
a plurality of segments adapted to be coaxially positioned around the first portion of the overload protector;
means formed on at least one of the segments for securing the second portion of the overload protector to the segments so as to restrict movement of the overload protector relative to the segments; and
means formed on the segments for securing the segments within the opening so as to restrict movement of the bushing and overload protector assembly relative to the motor shell;
wherein each of the segments has a portion which extends outwardly from an exterior surface of the motor shell and beyond an outwardly facing end portion of the overload protector when the bushing is operably positioned within the opening so as to shield the end portion of the overload protector from damage.

22. A bushing according to claim 21, wherein said plurality of segments comprise a pair of generally symmetrical segments connected together by a hinge to form a unitary structure.

23. A bushing according to claim 24, wherein each of said segments includes a portion which is disposed outwardly of the motor shell, relative to the opening, when the bushing is in an operable position, and further comprising means for mounting a gasket to said portions of the segments to protect the overload protector from dust and other contaminants.

24. A bushing according to claim 23, wherein said means for mounting the gasket comprises a circumferential groove formed in the segments and adapted to receive a mating circumferential portion of the gasket.

25. A bushing according to claim 21, wherein said segments are formed of a thermoplastic material, such as nylon.

26. A bushing according to claim 21, wherein said means for securing the second portion of the overload protector to the segments comprises a member extending from said segment across at least two surfaces of the second portion of the overload protector to restrict movement of the protector relative to the segment.

27. A bushing according to claim 26, wherein said member comprises a first portion extending perpendicularly from the segment across a first surface of the second portion of the protector, a second portion extending generally perpendicularly from said first portion across a second surface of the second portion of the protector, and a third portion extending from said second portion across a third surface of the protector so as to secure the protector to the segment.

28. A bushing for mounting an overload protector within an opening in a motor shell, comprising:
a plurality of segments adapted to be coaxially positioned around a relatively rigid portion of the overload protector;
means formed on at least one of the segments for non-deformably engaging the rigid portion of the overload protector for restricting movement of the overload protector relative to the segments; and
means formed on the segments for securing the segments within the opening so as to restrict movement of the bushing and overload protector assembly relative to the motor shell;
wherein each of the segments has a portion which extends outwardly from an exterior surface of the motor shell and beyond an outwardly facing end portion of the overload protector when the bushing is operably positioned within the opening so as to shield the end portion of the overload protector from damage.

29. A bushing according to claim 28, wherein said plurality of segments comprise a pair of generally symmetrical segments connected together by a hinge to form a unitary structure.

30. A bushing according to claim 29, wherein said unitary structure is formed of a thermoplastic material, such as nylon.

31. A bushing according to claim 28 further comprising means for mounting a gasket to a portion of said bushing which faces outwardly from the motor shell to protect the bushing and overload assembly from dust and contamination.

* * * * *